US007013311B2

(12) United States Patent
Hui et al.

(10) Patent No.: US 7,013,311 B2
(45) Date of Patent: Mar. 14, 2006

(54) PROVIDING XML CURSOR SUPPORT ON AN XML REPOSITORY BUILT ON TOP OF A RELATIONAL DATABASE SYSTEM

(75) Inventors: Joshua Wai-ho Hui, San Jose, CA (US); Ning Li, San Jose, CA (US); Hui-I Hsiao, Saratoga, CA (US); Parag V. Tijare, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 10/655,126

(22) Filed: Sep. 5, 2003

(65) Prior Publication Data

US 2005/0055336 A1   Mar. 10, 2005

(51) Int. Cl.
G06F 17/30 (2006.01)
(52) U.S. Cl. .............. 707/104.1; 707/101; 707/102
(58) Field of Classification Search .............. 707/1, 707/104, 101, 103, 3, 5
See application file for complete search history.

(56) References Cited

U.S. PATENT DOCUMENTS

| 6,366,934 | B1 |   | 4/2002  | Cheng et al.     | 707/513   |
|-----------|----|---|---------|------------------|-----------|
| 6,418,448 | B1 |   | 7/2002  | Sarkar           | 707/104.1 |
| 6,421,656 | B1 |   | 7/2002  | Cheng et al.     | 707/2     |
| 6,489,979 | B1 |   | 12/2002 | Belknap et al.   | 345/854   |
| 6,604,100 | B1 | * | 8/2003  | Fernandez et al. | 707/3     |
| 6,611,843 | B1 | * | 8/2003  | Jacobs           | 707/102   |
| 6,658,432 | B1 | * | 12/2003 | Alavi et al.     | 707/104.1 |
| 6,704,723 | B1 | * | 3/2004  | Alavi et al.     | 707/3     |
| 6,785,673 | B1 | * | 8/2004  | Fernandez et al  | 707/3     |
| 2002/0078041 | A1 |   | 6/2002  | Wu                    | 707/4   |
| 2002/0099687 | A1 |   | 7/2002  | Krishnaprasad et al.  | 707/1   |
| 2002/0099715 | A1 |   | 7/2002  | Jahnke et al.         | 707/100 |
| 2002/0156811 | A1 |   | 10/2002 | Krupa                 | 707/513 |
| 2003/0014397 | A1 |   | 1/2003  | Chau et al.           | 707/3   |

OTHER PUBLICATIONS

Dra Obasanjo , "A Survey of APIs and techniques for processing XML" ACM, Jul. 7, 2003.*
Jayavel et al., "Efficient publishing relational data as XML documents", ACM, Oct. 15, 2000.*
Fernandez et al., "Efficient evaluation of XML Middle ware queries" ACM, May 2001.*
Carey et al., "Keep your data flowing: Accessing multiple data sources made easy", ACM, Janaur 2004.*

(Continued)

Primary Examiner—Jean M. Corrielus
(74) Attorney, Agent, or Firm—Lacasse & Associates LLC; Randy W. Lacasse; Ramraj Soundararajan

(57) ABSTRACT

A system and method are provided for XML query cursor implementation through the steps of query translation and processing, query result navigation, and positioned update. An XML query cursor implemented in Interface Definition Language (IDL) as well as an extension to XQuery, an XML query language, is described. These steps are addressed by one of three approaches: multi-cursor, outer union, or hybrid. In each approach, XML data is assumed to be stored in a relational database with a mapping that maps each element to a row in a relational database table. In each approach, a system and method provide for cursor movements and positioned updates in increments of a node, sub-tree, or entire document. Given a user's navigation patterns, a system and method is provided to select either a multi-cursor, outer union, or hybrid approach as an optimal implementation for an XML query cursor.

15 Claims, 20 Drawing Sheets

OTHER PUBLICATIONS

Al-Khalifa et al., "Multi-level operator combination in XML query processing", ACM, Nov. 2002.*

"Context-Based Prefetch—an Optimization for Implementing Objects on Relations;" Bernstein et al.; *The VLDB Journal*; 2000; vol. 9; pp. 177-198.

"Design and Implementation of an XML Repository System Using RDBMS and IRS;" Kang et al.; *Journal of KISS: Computing Practices*; Feb. 2001; vol. 7, Issue 1; pp. 1-11.

"Efficient Evaluation of XML Middle-ware Queries;" Fernandez et al.; *AMC SIGMOD*; May 2001.

"Efficiently Publishing Relational Data as XML Documents;" Shanmugasundaram et al.; *Proceedings of the 26th International Conference on Very Large Databases*; 2000; pp. 65-76.

"An Automatic Navigation Scheme for XML Documents Through Object-Relational Repository;" Tseng et al.; *Fourth International Conference on Knowledge-Based Intelligent Engineering Systems & Allied Technologies*; 2000; pp. 428-431.

"From XML Schema to Relations: A Cost-Based Approach to XML Storage;" Bohannon et al.; pp. 1-28.

"A General Technique for Querying XML Documents Using a Relational Database System;" Shanmugasundaram et al.

"LegoDB: Customizing Relational Storage for XML Documents;" Bohannon et al.; *Proceedings of the 28th VLDB Conference*; 2002.

"Mixing Querying and Navigation in MIX;" Mukhopadhyay et al.; *Proceedings of the 18th International Conference on Data Engineering (ICDE '02)*; 2002.

"Optimizing Host Application Presentation Space Recognition Events Through Boundary Matching;" Webb et al.; *IBM Technical Disclosure Bulletin*; Dec. 2000; p. 2240.

"Publishing Relational Data in XML: the SilkRoute Approach;" Fernández et al.; Jun. 1, 2001; pp. 1-9.

"Querying XML Views of Relational Data;" Shanmugasundaram et al.; *Proceedings of the 27th VLDB Conference*; Roma, Italy; 2001.

"Relational Databases for Querying XML Documents: Limitations and Opportunities;" Shanmugasundaram et al.; *Proceedings of the 25th VLDB Conference*; Edinburgh, Scotland; 1999.

"Rewriting XQL Queries on XML Repositories;" Peter T. Wood; *Advances in Databases, Proceedings of 17th British National Conference on Databases*; Jul. 3-5, 2000; pp. 209-226.

"SilkRoute: A Framework for Publishing Relational Data in XML;" Fernández et al.; *ACM Transactions on Database Systems*; vol. V, No. N; pp. 1-55.

"Storing and Querying Ordered XML Using a Relational Database System;" Tatarinov et al.; *ACM SIGMOD* 2002; Jun. 4-6, 2000; pp. 204-215.

"Updating XML;" Tatarinov et al.; *ACM SIGMOD* 2001; May 21-24, 2001; pp. 413-424.

"XML and DB2;" Josephine Cheng; IBM Santa Teresa Laboratory; pp. 1-5.

"XPERANTO: A Middleware for Publishing Object-Relational Data as XML Documents;" Carey et al.; *Proceedings of the 26th International Conference on Very Large Databases*; Cairo, Egypt; 2000; pp. 646-648.

* cited by examiner

/Journal[./Editor/@name="James Bond"]/Article  } 200

/Journal[[./Editor/@name="James Bond"]/Article.page  } 202

SELECT DISTINCT Article.id, Article.title, Article.page
FROM Journal, Editor, Article
WHERE (Journal.id = Editor.parentid) AND (Editor.name = 'James Bond") AND (Journal.id =
(Editor.name = "James Bond") AND (Journal.id =
Article.parentid)
} 204

SELECT id, name, affiliation
FROM Author
WHERE parentid = ?

SELECT id, number, title
FROM Section
WHERE parentid = ?

SELECT id, number, note
FROM Paragraph
WHERE parentid = ?
} 206

SELECT ID, <ATTR$_1$>, <ATTR$_2$>, ....  ← 210
FROM <element_i table>
WHERE PARENTID = ?  ← 212
} 208

FIG. 2

```
nextTree():
    while (fResultSetStack.size() > 1)
        fResultSetStack.pop();
    ResultSet rs = fResultSetStack.top();
    if(rs.next())
        return true;
```
300

```
previousTree():
    while (fResultSetStack.size() > 1)
        fResultSetStack.pop();

resultSet rs = fResultSetStack.top();
    if (rs.previous())
        return true;
```
302

```
nextNode():
    if (childNode()) return true;
    else{
        do {
            if (nextSibling()) return true;
        } while (parentNode());

if (nextTree()) return true;
    }
```
304

```
previousNode():
    if (previousSibling()) {
        while (lastChildNode())
            ;
        return true;
    }
    else if (parentNode())
        return true;
    else if (previousTree()) {
        while (lastChildNode())
            ;
        return true
    }
```
306

```
nextNode(excludingDescendant = true):
    do {
        if (nextSibling()) return true;
    } while (parentNode());

if (nextTree()) return true;

previousNode(excludingAncestor = true):
    do {
        if (previousSibling()) {
            while (lastChildNode())
                ;
            return true;
```
308

*FIG. 3A*

```
        }
   } while (parentNode());

if (previousTree()) {
           while (lastChildNode())
               ;
           return true;
   }
} childNode():
   ResultSet rs = getNEFirstChildResultSet();
   if (rs.first()) {
           fResultSetStack.push(rs);
           return true;
   } parentNode():
   if (fResultSetStack.size() > {
           fResultSetStack.pop();
   return true;
   } nextSibling():
   ResultSet rs = fResultSetStack.top();
   if (rs.next()) return true;
   else {
           rs = getNENextSibResultSet();
           if (rs.first()) {
                   fResultSetStack.pop();
                   fResultSetStack.push(rs);
                   return true;
           }
   } previousSibling():
   ResultSet rs = fResultSetStack.top();
   if (rs.previous()) return true;
   else {
           rs = getNEPrevSibResultSet();
           if (rs.last()) {
                   fResultSetStack.pop();
                   fResultSetStack.push(rs);
                   return true;
           }
   } lastChildNode():
   ResultSet rs = getNELastChildResultSet();
   if (rs.last()) {
           fResultSetStack.push(rs)
           return true;}
```

```
WITH
Article_t(id1, id2, id3, id4, a1, a2, a3, a4, a5, a6, a7, a8) AS (
    SELECT DISTINCT Article.id, null, null, null, null, Article.title, Article.page, null, null, null, null, null, null
    FROM Journal, Editor, Article
    WHERE (Journal.id = Editor.parentid) AND (Editor.name = "James Bond:") AND (Journal.id = Article.parentid)
),                                                                                                                      } 402
Author_t(id1, id2, id3, id4, a1, a2, a3, a4, a5, a6, a7, a8) AS (
    SELECT id1, id, null, null, null, null, name, affiliation, null, null, null, null
    FROM Article_t, Author
    WHERE Article_t.id1 = Author.parentid
),                                                                                                                      } 404
Section_t(id1, id2, id3, id4, a1, a2, a3, a4, a5, a6, a7, a8) AS (
    SELECT id1, null, id, null, null, null, null, null, number, title, null, null
    FROM Article_t, Section
    WHERE Article_t.id1 = Section.parentid
),
Paragraph_t(id1, i2, i3, id4, a1, a2, a3, a4, a5, a6, a7, a8) AS (
    SELECT id1, null, id3, id, null, null, null, null, null, null, number, note
    FROM Section_t, Paragraph
    WHERE Section_t.id3 = Paragraph.parentid
),
OuterUnion_t(id1, id2, id3, id4, a1, a2, a3, a4, a5, a6, a7, a8) AS (
    (SELECT * FROM Article_t)
    UNION ALL
    (SELECT * FROM Author_t)
    UNION ALL
    (SELECT * FROM Section_t)
    UNION ALL
    (SELECT * FROM Paragraph_t)
)                                                                                                                       } 406
408 → SELECT * FROM OuterUnion_t
410 → ORDER BY id1, id2, id3, id4

SELECT <element_number> as ElementNumber,
    <parentce_1>.ID1,<parentce_2>.ID2,...,
    <childtab>.ID AS ID<i+1>,
    <childtab>.<ATTR₁>, <childtab>.<ATTR₂>,...,m
    <childtab>.<ATTR₁>, <childtab>.<parentce_1>,...., <parentce_i>
FROM <childtab> <parentce_1>, <parentce_i>
WHERE <childtab>.<PARENTID> = <parentce_i>.Idi                                                                           } 412
```

FIG. 4

```
500 ──▶  SELECT id1, id2, id3, id4,
502 ──────▶     RANK() OVER(PARTITION BY id1
                     ORDER BY id2 DESC, id3 DESC, id4 DESC)
                AS to_next_tree,
504 ──────▶     CASE
                WHEN element_type = "Article"
                THEN RANK() OVER(PARTITION BY id1
506 ────────────▶    ORDER BY id2 DESC, id3 DESC, id4 DESC)
                WHEN ELEMENT_TYPE = "sECTION"
                THEN RANK() OVER(PARTION BY id1, id3
                     ORDER by id4 DESC)
                ELSE 1 END
508 ──────▶     AS descendant_count
510 ──▶  FROM OuterUnionTable
```

*FIG. 5*

```
600    nextTree():
           while (nextNode()) {
                   if (fCurrentNode.isTreeRoot())
                           return true;
           }

602    previousTree():
           if (currentTree())
                   if (previousNode())
                           if (currentTree())
                                   return true;

604    nextNode():
           if (fResultSet.next())
                   return true;

606    previousNode():
           if (fResultSet.previous())
                   return true;

608    nextNode(excludingDescendant = true):
           while (nextNode()) {
                   if (ifCurrentNode.isDescendantOf(fSavedNode))
                           return true;
           }

610    previousNode(excludingAncestor = true):
           while (previousNode()) {
                   if (ifSavedNode.isDescendantOf(fCurrentNode))
                           return true;
           }

612    childNode():
           if (nextNode())
                   if (fCurrentNode.isChildOf(fSavedNode))
                           return true;

614    parentNode():
           while (previousNode()) {
                   if (fSavedNode.isChildOf(fCurrentNode))
                           return true;
           }

616    nextSibling():
           while (nextNode()) {
                   if (fCurrentNode.isSiblingOf(fSavedNode))
                           return true;
                   if (ifCurrentNode.isDescendantOf(fSaveNode.pidindex, fSaveNode.pid))
                           break; // fail
```

618  previousSibling():
        while (previousNode()) {
                if (fCurrentNode.isSiblingOf(fSavedNode))
                        return true;
                if (fCurrentNode.isTreeRoot() || fSaved.isChildOf(fCurrentNode))
                        break; // fail currentTree():
620     do {
                if (fcurrentNode.isTreeRoot))
                        return true;
        } while (previousNode());
```

*FIG. 6B*

```
nextTree():
    int distance = fCurrentNode.getToNextTree();
    if (relativeNode(distance))
        return true;

nextNode(excludingDescendant = true):
    int distance = fCurrentNode.getDescendantCount() + 1;
    if (relativeNode(distance))
        return true;

parentNode():
    int distance = fCurrentNode.getToParentNode();
    if (relativeNode(-distance))
        return true;

nextSibling();
    int distance = fCurrentNode.getDescendantCount() + 1;
    if (relativeNode(distance))
        if (fCurrentNode.isSiblingOf(fSavedNode))
            return true;

previousSibling():
    // if a node has a previous sibling
    // it must be either its previous node or
    //  an ancestor of its previous node
    if (previousNode())
        do {
            if (fCurrentNode.isSiblingOf(fSavedNode))
                return true;
        } while (parentNode());

relativeNode(int distance):
    if (fResultSet.relative(distance))
        return true;

currentTree():
    int distance = fCurrentNode.getToCurrentTree();
    if (relativeNode(-distance))
        return true;
```

```
For Article:
WITH
Author_t(id2, id3, a3, a4, a5, a6) AS (
        SELECT id, null, name, affiliation, null, null
        FROM Author
        WHERE Author.parentid = ?
),
Section_t(id2, id3, a3, a4, a5, a6) AS (
        SELECT null, id, null, null, number, title
        FROM Section
        WHERE ection.parentid = ?
),
OuterUnion_t(id2, id3, a3, a4, a5, a6) AS (
        (SELECT * FROM Author_t)
        UNION ALL
        (SELECT * FROM Section_t)
)
SELECT * FROM OuterUnion_t
ORDER BY id2, id3

For Section: // only one child type
SELECT id, number, note
FROM Paragraph
WHERE parentid = ?
```

- 700: Author_t CTE block
- 702: Section_t CTE block
- 704: OuterUnion_t CTE block
- 706: SELECT * FROM OuterUnion_t
- 708: ORDER BY id2, id3
- 710: For Section block
- 712: entire grouping

FIG. 7

```
childNode():
    ResultSet rs = getChildResultSet();
    if (rs.first()) {
            fResultSetStack.push(rs);
            return true;
    }
```

800

```
nextSibling():
    ResultSet rs = fResultSetStack.top();
    if (rs.next())
            return true;
```

802

```
previousSibling():
    ResultSet rs = fResultSetStack.top();
    if (rs.previous())
            return true;
```

804

```
lastChildNode():
    ResultSet rs = getChildResultSet();
    if (rs.last()) {
            fResultSetStack.push(rs);
            return true;
    }
```

900  SQL UPDATE ELEMENT SET ATTR$_k$ = ATTRValue
      WHERE ID = ID$_{current}$ 902  SQL UPDATE ELEMENT SET ATTR$_k$ = NULL
      WHERE ID = ID$_{current}$ 904  SQL INSERT INTO ELEMENTi ( ID, PARENTID, ATTR$_{(0,1)}$ , ATTR$_{(0,2)}$ , ...., ATTR$_{(0,k)}$ )
      VALUES ( IDnew$_j$, ID $_{(parent)}$ , ATTRValue$_{(0,1)}$ , ..., ATTRValue$_{(0,2)}$ , ...., ATTRValue$_{(0,k)}$ )

906  SQL INSERT INTO ELEMENTi ( ID, PARENTID, ATTR$_{(j,1)}$ , ATTR $_{(j,2)}$ , ..., ATTR $_{(j,k)}$ )
      VALUES ( IDnew$_j$, ID $_{(parent,j)}$ , ATTRValue$_{(j,1)}$, ATTRValue $_{(j,2)}$ , ...., ATTRValue$_{(j,k)}$)

908  SQL DECLARE CURSOR Cj FOR
        SELECT ID
        FROM ELEMENTj
        WHERE PARENTID = ID$_{(parent,j)}$ 910  SQL DELETE FROM ELEMENTj
        WHERE CURRENT OF Cj

FIG. 9

```
                        1118        1102        1104      1106              1108
                         ⌒          ⌒            ⌒         ⌒                 ⌒
1110 ──→        DECLARE CURSOR <cursor-name> [<sensitivity>] [SCROLL] FOR <xquery-expr>
1112 ──→        FOR <updatability>
                [<optimization>]

1114 ──→        <sensitivity>       : INSENSITIVE | SENSITIVE
1116 ──→        <updatability>      : READ ONLY | UPDATE
1118 ──→        <optimization>      : OPTIMIZE FOR MAX DEPTH <n-level>

1118       1120
                 ⌒          ⌒
                OPEN CURSOR  <cursor-name>

1122       1124
                 ⌒          ⌒
                CLOSE CURSOR  <cursor name>

1126                        1128
                 ⌒                           ⌒
                FETCH FROM CURSOR   <cursor name>
1130 ──→           <axis-operation>
1132 ──→           [<fetch-unit>]
1134 ──→           [<content-part>]
                INTO (STRING <host-variable> | DOM<host-variable>)

<axis-operation>   : NextTree
                                   | PreviousTree
                                   | NextNode [EXCLUDING Descendant]
                                   | PreviousNode [EXCLUDING Ancestor]
                                   | ChildNode
                                   | ParentNode
                                   | NextSibling
                                   | PreviousSibling
                                   | INCLUDING SUBTREE [OF MAX DEPTH <n>]

<fetch-unit>       :
                <content-unit>     : WITH (TEXT | ATTRIBUTES) ONLY
```

FIG. 11A

{ SAVE CURRENT POSITION OF CURSOR <cursor-name> IN <host-variable>
  └─1142─┘                        └────1138────┘    └──1144──┘   └──1140──┘
                                                                 └──1146──┘

{ SET CURRENT POSITION OF CURSOR <cursor-name> TO <host-variable>
  └─1148─┘

{ UPDATE WHERE CURRENT OF CURSOR <cursor-name> {
     {<update-operation>;}+
     └──1152──┘
}

<Update-operation> :
    INSERT (STRING <node-variable> | DOM <node-variable>) [BEFORE | AFTER]
  | INSERT ATTRIBUTE <attribute-name> <attribute-value>
  | REPLACE WITH (STRING <node-variable> | DOM <node-variable>)
  | UPDATE ATTRIBUTE <attribute-name> <attribute-value>
  | DELETE
  | DELETE ATTRIBUTE <attribute-name>

*FIG. 11B*

```
exception XMLException {
  unsigned short code;
}
```

1200 ─ interface XMLResultSet {

```
// The insert position
const unsigned short INSERT_APPEND = 0;
const unsigned short INSERT_BEFORE = 1;
const unsigned INSERT_AFTER = 2;

// Moves the cursor forward one node tree from the current node tree.
// Return:   true, if the next node tree is valid;
//           false, if there are no more node trees
```
1202 ─▶ `boolean nextTree() raises(XMLException);`

```
// Moves the cursor backward one node tree from the current node tree.
// Return:   true, if the previous node tree is valid;
//           false, if it is off the result sequence
```
1204 ─▶ `boolean previousTree() raises(XMLException);`

```
// Moves the cursor forward one node from its current node position.
// Note:   When the current node is the last node in the current
//         node tree, a call to this method will return the root
//         node of the next node tree.
```
1200 ─ `// Return:   true if the next node is valid;`
`//           false if there are no more nodes`
1206 ─▶ `boolean nextNode() raises(XMLException);`

```
// Moves the cursor forward to the next node
// or the next-but-not-descendant node
// Parameter: excludingDescendant -- true to exclude any descendant
//                                   node; false to include all
// Return:   true if the next-or-not-descendant node is valid;
//           false if there are no more valid nodes
```
1208 ─▶ `boolean nextNode(in boolean excludingDescendant) raises(XMLException;`

```
// Moves the cursor backward one node from its current node position.
// Note:  Same as both nextNode methods, both previousNode methods
//        work across tree boundaries
// Return:   true if the previous is on a valid node;
//           false if it is off the result sequence
```
1210 ─▶ `boolean previousNode() raises(XMLException);`

```
// Moves the cursor backward to the previous node (same as
// previousNode()) or the previous-but-not-ancestor node
// Parameter: excludingAncestor true to exclude any ancestor node;
```

*FIG. 12A*

```
             //         false to include all
             // Return: true, if the previous-or-not-descendant
             //         node is valid; false if it is off the result sequence
1212 ─────▶ boolean previousNode(in boolean excludingAncestor) raises(XMLException);

// Moves the cursor forward to the first child node of the current node
             // position.
             // Return: true if the first child of the current node is valid;
             //         false if there are no child nodes
1214 ─────▶ boolean childNode() raises(XMLException);

// Moves the cursor backward to the parent node of the current node
             // position.
             // Return: true if the parent node of the current node is valid;
             //         false if there is no parent node
1216 ─────▶ boolean parentNode() raises (XMLException);

// Moves the cursor forward to the next sibling node of the current node
             // position.
             // Note: When the current node is the root of the current node
             //       tree, a call to this method will return false. An alternative
             //       is to return the root node of the next node tree.
             // Return: true if the next sibling node is valid;
      1200   //         false if this is the last child of its parent node
          ─▶ boolean nextSibling() raises(XMLException);

1218 ─┘
             // Moves the cursor backward to the previous sibling node of the current
             // node position.
             // Note: Same as nextSibling method, currently previousSibling does
             //       not work across tree boundaries.
             // Return: true if the previous sibling node is valid;
             //         false if this is the first child of its parent node
1220 ─────▶ boolean previousSibling() raises(XMLException);

// Gets the String representation of the current node of this
             // XMLResultSet object.
             // Return: a string representing the current node of this
             //         and text if it is an element node
1222 ─────▶ StringBuffer getString() raises(XMLException);

// Gets the String representation of the subtree starting at
             // the current node of this XMLResultSet object.
             // Parameter: depth -- the depth to which the subtree will be fetched
             // Return: a String object representing the subtree
1224 ─────▶ StringBuffer getString(in int depth) raises(XMLException);

// Gets the DOM representation of the current node of this
             // XMLResultSet object.
             // Return: a DOM Node object representing the current node including
```

```
         //       attributes and text if it is an element node
 1226    Element getDOM() raises(XMLException);

// Gets the DOM representation of the subtree starting at the
         // curretn node of this XMLResultSet object.
         // Parameter: depth -- the depth to which the subtree will be fetched
         // Return:   a DOM Node object representing the current subtree
 1228 →  Element getDOM(in int depth) raises(XMLException);

// Insert a new attribute to the node at the current cursor position
         // Parameter: attrName -- the name of the attribute
         //            value -- the attribute value
         // Return:   true if the operation succeeds; false if fails
         // Exception: if it is a Text node
         // Exception: if the attribute already exists
         // Exception: if the type of the value does not match
 1230 →  boolean insertAttribute (in string attrName,
                                  in string value) raises(XMLException);

// Update an existing attribute of the node at the current cursor position
         // Parameter: attrName -- the name of the attribute to be updated
         //            value -- the new value
         // Return;   true if the operation succeeds; false if it fails
         // Exception: If the attribute does not exist
         // Exception: If the type of the value does not match
 1232 →  boolean updateAttribute(in string attrName,
                                 in string value) raises (XMLException);

// Delete an attribute from the node at the current cursor position
 1200    // Parameter: attrName -- the name of the attribute to be removed
         // Return:   true if the operation succeeds; false if fails
         // Exception: if the attribute does not exist
         // Exception: if the attribute is not an optional attribute
 1234 →  boolean deleteAttribute(in string attrName) raises(XMLException);

// Insert a new document fragment either before or after the current
         // position
         // Parameter: xmldoc -- the XML fragment to be inserted, described in a
         //                     string format
         //            position -- where to be inserted. Possible values are
         //                     INSERT_APEND, INSERT_BEFORE and INSERT_AFTER
         // Return:   true if the operation succeeds; false if fails
         // Exception: if the insert document is not a well-formed XML document
         // Exception: if the insert document is not a well-formed XML document
         // Exception: if the outcome of the insert document violates the schema definition
 1236 →  boolean insert(in string xmldoc,
                        in unsigned short position) raises(XMLException);

// Insert a new document fragment either before or after the current
         // position
         // Parameter: xmldoc -- the XML fragment to be inserted, as an input stream
         //            position -- where to be inserted. Possible values are
         //                     INSERT_APPEND, INSERT_BEFORE and INSERT_AFTER
         // Return:   true if the operation succeeds; false if fails
         // Exception: if the insert document is not a well-formed XML document
```

```
                    // Exception: if the outcome of the insert document violates the schema
                    //          definition
1238 ──→    boolean insert(in InputStream xmldoc,
                           in unsigned short position) raises(XMLException);

// Insert a new document fragment either before or after the current
            // position
            // Parameter: xmldoc -- the XML fragment to be inserted, in a DOM
            //                      representation
            //            position -- where to be inserted. Possible values are
            //                        INSERT_APPEND, INSERT_BEFORE and INSERT_AFTER
            // Return:   true if the operation succeeds; false if fails
            // Exception: if the outcome of the insert document violates the schema definition
1240 ──→    boolean insert(in Document xmldoc,
                           in unsigned short position) raises(XMLException);

// Replace the subtree at the current cursor position by a new document fragment
            // Parameter: xmldoc -- the XML fragment which replaces the current subtree,
            //                      described in the string format
            // Return:   true if the operation succeeds; false if fails
            // Exception: if the given document fragment is not a well-formed XML document
            //            if the outcome of the insert document violates the schema
            //            definition
1242 ──→    boolean replace(in string xmldoc) raises(XMLException);

// Replace the subtree at the current cursor position by a new document fragment
            // Parameter: xmldoc - the XML fragment which replaces the current subtree,
            //                     as an input stream
            // Return:   true if the operation succeeds, false if fails
            // Exception: if the given document fragment is not a well-formed XMLdocument
            //            if the outcome of the insert document violates the schema definition
1244 ──→    boolean replace(in InputStream xmldoc) raises(XMLException);

// Replace the subtree at the current cursor position by a new document fragment
            // Parameter: xmldoc -- the XML fragment which replaces the current subtree,
            //                      in the DOM representation
            // Return:   true if the operation succeeds; false if fails
            // Exception: if the outcome of the insert document violates the schema definition
1246 ──→    boolean replace(in Document xmldoc) raises(XMLException);

// Delete the subtree at the current cursor position
            // Return:   true if the operation succeeds; false if fails
            // Exception: if the deletion causes the violation of the occurrence constraint
1248 ──→    boolean delete() raises(XMLException);

// Gets the current cursor position
            // Return:   true if the operation succeeds; false if fails
            XMLCursorPosition getCursorPosition() raises(XMLException);

// Sets the current cursor position
            // Return:   true if the operation succeeds; false if fails
1250 ──→    boolean setCursorPosition(in XMLCursorPosition pos) raises(XMLException);
            }
```

*FIG. 12D*

PROVIDING XML CURSOR SUPPORT ON AN XML REPOSITORY BUILT ON TOP OF A RELATIONAL DATABASE SYSTEM

BACKGROUND OF THE INVENTION

1. Field of Invention

The present invention relates generally to the field of query navigation in a hierarchically structured document. More specifically, the present invention is related to a cursor implementation for an XML data or result set.

2. Discussion of Prior Art

Extensible Markup Language (XML) is becoming a widely used format and standard for data exchange between disparate computer systems on the Internet. As XML attracts a growing number of users, the need arises to manage XML documents in relational databases residing on such disparate computer systems, since much of the data involved in data transactions is stored on relational databases. However, basic XML document structure is quite different from the structure of a relational, or more specifically, Standardized Query Language (SQL) database. Because of the disparate nature of these languages, integration presents a challenge.

Structure of XML Documents and SQL Queries

XML is a tagged, hierarchical language used to define documents. It employs the use of tags to structure and describe documents. An XML document may have two parts: a markup document and optionally, a document schema. XML documents are made up of storage units called elements, which can be nested to form a hierarchical structure. Elements can contain either parsed or unparsed data. Parsed data is made up of characters, some of which form character data, and some of which form markup. Markup encodes the description of a document's storage layout and logical structure. An XML document starts with a root element at the top of its hierarchy. Each element, including a root element, has a tag associated with it. In the XML language, tags do not simply define the manner in which data is displayed; rather they describe the data itself. Tags also determine the hierarchical nature of the data, or how a document is logically structured. Thus, different computer systems may interpret an XML document differently.

The root element is at the highest level of hierarchy in an XML document or schema. A child element descends from another element one level of hierarchy above itself. Parent elements are elements that spawn one or more elements at one level of hierarchy below themselves. An element may be a parent or child depending on a relationship between two elements. Child elements with the same parent are called sibling elements. Elements may also have different content types. An XML element includes everything from a start tag to an end tag, which is considered markup. An element may have element content (containing another element or elements), mixed content (containing both text and other elements), simple content (containing only text), or empty content (containing no information). An element may also have attributes and these attributes have values.

The structure of an XML document is as follows: a root element may have attributes with associated attribute values that describe the element as well as nested elements or sub-elements that also have attributes and associated attribute values. Nested elements or sub-elements may have further nested elements or sub-elements. The graph structure of an XML schema can be classified as a tree. Each element corresponds to a node of a tree, and a sub-tree is defined as a part of XML schema.

XML schemas specify constraints on structures and types of elements in an XML document. The basic schema for XML is a DTD (Document Type Definition).

An SQL query is made of keywords and values that determine which data is to be accessed or displayed, what operation is to be performed on that data, in which tables data is to be found, and optionally, conditions that reduce the size of a resultant dataset. When an SQL query is sent to a relational database, a resultant dataset comprised of tuples will be returned. Tuples that describe an XML document are different from tuples returned by a relational database without XML generating or publishing capabilities. This is because they contain element, order, and hierarchy information. These tuples are elements of an XML structure along with their attributes, references, and child elements. In essence, tuples describe an XML document in the absence of graphical aid.

Integration of XML and SQL

In order to take advantage of XML, XML must somehow be integrated with SQL. Prior art in the field discuss methods of displaying or publishing relational data as XML documents. However, difficulties arise because relational databases have flat, "single-axis" methods of navigating through rows and columns. A cursor implemented for a relational database need only traverse backwards and forwards through a dataset, since there is no hierarchy or graph structure to results of a query to a relational database. Because XML data or a dataset resulting from an XML query is multi-dimensional, navigating through an XML dataset would require moving a cursor in multiple dimensions. A cursor implemented in a markup language, such as XML, would need to provide for data traversal in multiple dimensions and directions, as well as providing for traversal of an XML document in a step size of varying granularity. The increment of a single movement associated with an XML cursor may be an entire tree, a branch of a tree, or a single node. Thus, it is desired for a cursor to move in multiple dimensions in increments corresponding to a node, a tree, or a branch.

XML Navigation and Cursor Implementation

In order to effectively navigate an XML dataset stored in an XML repository based on a relational database system, some provision needs to be made for tagging and structuring relational data. Thus, methods of relational database query preparation; processing, tagging, and structuring are discussed. Methods known in the art include an SQL-92™ cursor interface that is defined by fetching operations such as "fetch next" and "fetch prior" for relational data. A similar interface is described for JDBC 2.0™ (Java Database Connectivity). However, the cursor interface is far from adequate for flexible traversal or fetch of multi-dimensional XML data. DOM (Document Object Model) and Oracle's JXQI™ (Java XQuery API) define a general interface to manipulate an XML document, however, they do not address the aspect of persistent storage, which is, essential for supporting positioned update. Positioned update will be discussed in future sections.

To accomplish effective cursor implementation and query result navigation, several issues must be considered. A query processor must translate an XML query, which can be issued as either an XQuery statement or an XPath query. A query processor translates an XQuery statement or XPath query into one or more SQL queries. Methods may be applied to translated SQL queries to modify results returned by queries or to incorporate XML document order information into SQL queries. Queries are then sent to a relational database, either one at a time or all at a same time. Relevant XML data may be determined from the results and returned to a user. Such an SQL query would produce a result tuple containing an element type, associated content data, and hierarchy information.

Prior art references in the field of query processing make mention of this as an outer union method. "Efficiently publishing relational data as XML documents," teaches methods and implementations for generating and publishing an XML document via a relational database. An outer union approach specifies a method for gathering all attributes and elements in an XML document. Each distinct element and attribute and value pair is "joined" at a leaf level of an XML document to form a tuple. Joined element and attribute information is percolated up through an XML structure. Each time a distinct element and attribute and value pair is encountered, it is added to the tuple. Those nodes that do not have a value for each attribute in the tree store a null value in the column for that particular attribute.

To retain the order of elements in an XML document, each tuple contains a type column to distinguish elements. In addition, output tuples may be sorted so that child element data comes after parent data and child elements of different parents nodes are not intermixed. Sorting tuples obtained by an outer union method ensures that parent information occurs before or with child information, all tuples represent information about a node and its descendants in an XML tree occur contiguously in a tuple stream, siblings of different types will appear in a consistent order. Tuple results of a query are ordered by a sort sequence, which ensures the result is in document order. A sort sequence contains attributes associated with elements of parents before children, ID fields appearing in a sort sequence in the reverse order as siblings are to appear in an XML document, and lastly, user-defined order fields on a node appear immediately before the ID field of that node in a sort sequence.

These methods are part of a larger class of generating or reconstructing an XML document, wherein output tuples are sorted so that child element data comes after parent data and child elements of different parents are not intermixed. When an XML structure is stored across multiple tables, there are a number of possible ways of returning results. One approach might be to open a series of nested cursors across each table, but this would require modification to an underlying database. Another approach could be to create a "wide" tuple containing all possible attributes within an XML sub-tree, a joining constituent relational tables and returning results, but this produces large amounts of redundant data. These methods are of interest because they structure relational tuples in the order they need to appear in an XML result.

However, these methods as presented in prior art are useful in a context of publishing relational data in XML form. These methods need to be extended if they are to incorporate the processing of an XQuery statement. XQuery and XPath may be used to retrieve specific parts of XML just as data is retrieved from a database. XQuery and XPath provide syntax for specifying which elements and attributes to retrieve. "Updating XML" and "Content Management System and Methodology Featuring Query Conversion Capability for Efficient Searching" both teach a method of XQuery processing, but do not make mention of navigating a resultant XML document. "Publishing Relational Data in XML: a SilkRoute Approach" also teaches a method of query processing and XML data publishing using a declarative query language called RXL. "Content Management System and Methodology Featuring Query Conversion Capability for Efficient Searching" teaches a method of top-level SQL query generation, however it is limited it does not provide for the selection of all attributes associated with top-level elements.

Although prior art addresses query generation, translation, and processing it does not make mention of a specific cursor implementation or result navigation method. The challenges of translating XML updates into SQL go beyond those of translating queries. It would be beneficial to generate efficient SQL update statements, which would in turn be translated from an XML query. Ideally, each XML update would be translated into a single SQL command, because issuing multiple separate SQL statements incurs overhead and prevents a relational database from performing large-scale optimizations.

The former reference, "Updating XML", also has a premise for a searched update function. It describes an XML data model and a set of logical operations for updating both ordered and unordered XML data, and how those operations can be added to the XQuery language. Searched update is an update that contains a query determining which portion of the data is to be updated. Therefore, a searched update statement contains both new data as well as search criteria. However, the prior art does not address a positioned update function. For a positioned update, the location of the update is determined by the current cursor position.

The storage of XML documents in relational databases is described in "Relational Databases for Querying XML Documents: Limitations and Opportunities". XML documents are queried by processing a DTD to generate a relational schema, parsing XML documents conforming to DTDs and loading them into tuples of tables in a standard relational database, translating semi-structured queries over XML documents into SQL queries over a corresponding relational data and finally, converting a results back into XML.

Prior art generally illustrating known methods of generating and navigating hierarchical documents are described below. U.S. Patent 2001/0037345 A1 (to Kiernan et al. assigned to International Business Machines Corporation) provides a method for publishing relational data as XML data by translating XML queries into queries to a relational database. Each relational table is mapped to a virtual XML document, and XML queries are issued over these virtual documents. An XML query is parsed and transformed into a language-neutral intermediate representation, which is a sequence of operations describing how the output document is derived from underlying relational tables.

U.S. patent 20030014397 A1 discloses a method for generating one or more XML documents from a relational database using an XPath data model. This reference is limited in that an XPath query translated into an SQL query appears to only return root nodes of an XML document.

Existing XML cursor-like definitions taught by prior art in the field attempt to navigate query results by way of a relational data model, the prior art is limited in that methods and implementations of XML navigation are taught by way of a relational data model rather than an XML data model.

Whatever the precise merits, features and advantages of the above cited references, none of them achieve or fulfill the purposes of the present invention. Thus, a method and implementation for translating, processing, and navigating a relational database query in a context of a hierarchical document is sought.

SUMMARY OF THE INVENTION

The present invention addresses XML query cursor implementation through the steps of query translation and processing, query result navigation, and positioned update. An XML query cursor implemented in Interface Definition Language (IDL) as well as an extension to XQuery, an XML query language, is described. These steps are addressed by one of three embodiments: multi-cursor, outer union, or hybrid embodiment. In each embodiment, XML data is assumed to be stored in a relational database table with a mapping which maps each element to a relational database table with a column designated for each attribute of each element, a column optionally designated for optional element content, and two columns designated for an element ID and a parent ID which captures parent-child relationship of element hierarchy. In each embodiment, the present invention provides for cursor movements and positioned updates in increments of a node, sub-tree, or entire document. The outer union embodiment also inventively uses an OLAP partition function to calculate the distance between a current position and a target position. Given a user's navigation patterns, the present invention provides for a system and method to select either a multi-cursor, outer union, or hybrid embodiment as an optimal implementation for an XML query cursor.

BRIEF DESCRIPTION OF A DRAWINGS

FIG. 2 is an XQuery statement and a corresponding translated top-level SQL statement and multiple parameterized queries.

FIGS. 3a–3b illustrates pseudo code for XML query cursor movements in a multi-cursor embodiment of the present invention.

FIG. 4 is an SQL outer union query.

FIG. 5 is an SQL query with distance information.

FIGS. 6a–6b illustrates pseudo code for XML query cursor movements without incorporating distance information in an outer union embodiment of the present invention.

FIG. 6c illustrates pseudo code for XML query cursor movements incorporating distance information in an outer union embodiment of the present invention.

FIG. 7 illustrates parameterized SQL queries in a hybrid embodiment of the present invention.

FIG. 8 illustrates pseudo code for XML query cursor movements in a hybrid embodiment of the present invention.

FIG. 9 illustrates SQL queries for positioned update.

FIG. 11 illustrates XML query cursor implementation as an extension to XQuery.

FIGS. 12a–12d illustrates XML query cursor implementation in an Interface Definition Language (IDL).

DESCRIPTION OF THE PREFERRED EMBODIMENTS

Figure 1:
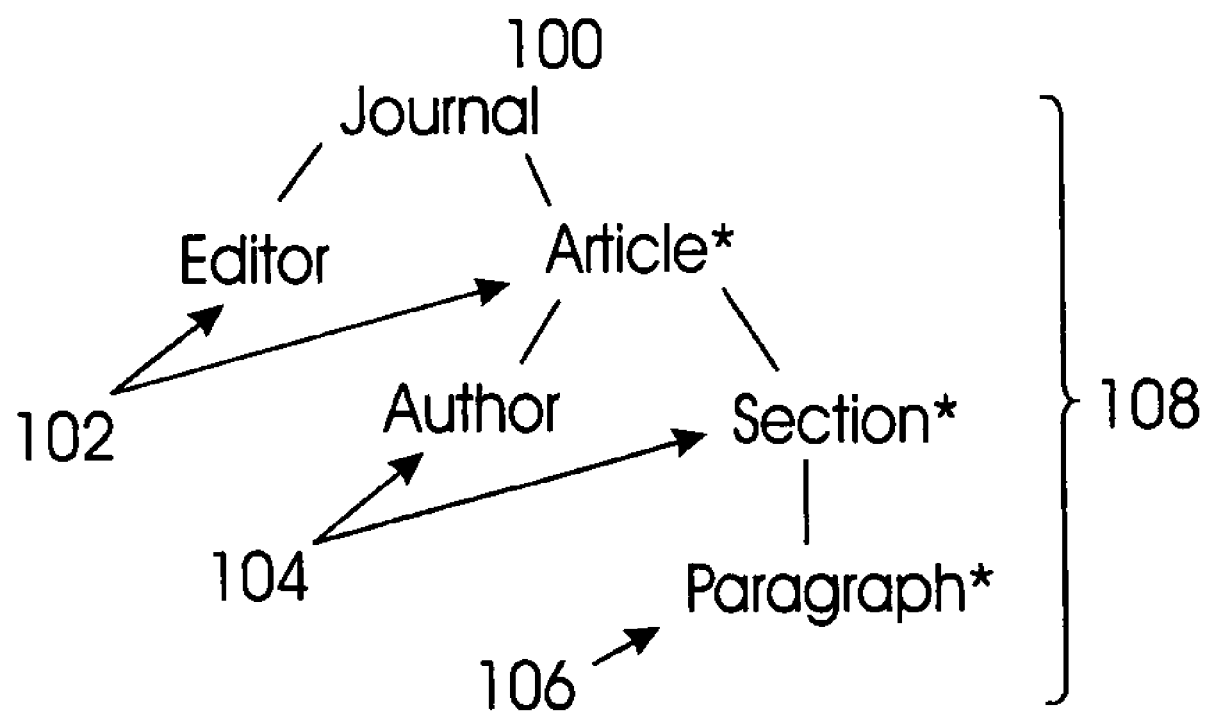
FIG. 1 is a schematic diagram of an XML document.

While this invention is illustrated and described in a preferred embodiment, a system or method may be produced in many different configurations. There is depicted in the drawings, and will herein be described in detail, a preferred embodiment of an invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention addresses XML query cursor implementation through the steps of query translation, query result navigation, and positioned update. An XML query cursor implemented in Interface Definition Language (IDL) as well as an extension to XQuery, an XML query language, is described. These steps are addressed by one of three embodiments: multi-cursor, outer union, or hybrid embodiment. In each embodiment, XML data is assumed to be stored in a relational database table with a mapping which maps each element type to a relational database table with a column designated for each attribute of each element, a column optionally designated for optional element content, and two columns designated for an element id and a parent id which captures the parent-child relationship of an element hierarchy. Each element instance is stored as a row in a corresponding relational table. Within a single element name, because of differences in scope, an element type may appear different. Thus, different element types are mapped to different relational tables.

For each embodiment, the step of query translation starts with XML queries being issued over XML documents. XML queries are translated to a query language corresponding to an underlying relational database. Translation occurs because an underlying relational database table stores XML element, content, and attribute information, as well as hierarchy and markup information in its relational columns. More specifically, an XML query is translated into an SQL query over an underlying relational database. Multiple parameterized queries are then generated to produce, in a result, elements of different element types. The SQL query or parameterized SQL queries are executed, and SQL query results are used to generate marked up XML output. For each embodiment, the step of query navigation occurs when an XML document resulting from marked up XML output is navigated by an XML query cursor.

A Multi-Cursor Approach

In a first embodiment, a multi-cursor approach is used to define an XML query cursor. In a multi-cursor approach to XML query cursor definition, a number of queries corresponding to the number of element types in a result are generated. The step of query processing is defined by translating an XQuery statement into a top-level SQL query and generating a parameterized list of SQL queries, one for each relation an element type in a result would map to.

Referring now to FIG. 1, an XML schema 108 having a root element 100 and child elements 102, 104, 106 is shown. Editor and Article elements 102 are siblings of one another and Author and Section elements 104 siblings as well. Paragraph element 106 is a child of Section element 104 and Section element 104 is a child of Article element.

In FIG. 2, an XQuery statement 200 is translated to produce a top-level SQL query 202. An XQuery statement 200 and top-level SQL statement 202 refer to elements of the XML Schema 108 shown in FIG. 1. Logically, adding all attributes of a root element 100 to an SQL statement 202, translated from an XQuery statement 200, generates a top-level SQL query 202. For each child element of a root element 100, an SQL query 204 is constructed from a top-level SQL query 202. A parameterized SQL query 204 is constructed according to an SQL template 206, where $ATTR_k$ 208 is the $k^{th}$ attribute column of an element, table 210. Each query constructed from a top-level SQL query 202 is associated with a corresponding element in a schema hierarchy. Parent-child relationships between parameterized queries are thus reflected in the hierarchy. This process is repeated to construct a parameterized version of a top-level SQL query for all descendant elements 102, 104, 106 of a root element. In this case, four queries are generated—one for each element type (e.g. Article, Author, Section and Paragraph). Article is the root element type in the result. A translated top-level SQL query produces Article elements. The three parameterized queries following produce Author, Section, and Paragraph elements respectively. Details of translating a query from XQuery to SQL and of generating a top-level SQL query are described in references teaching prior art in a field.

In this embodiment, the step of query navigation is implemented by a plurality of SQL cursors. Executing parameterized SQL queries 204 constructed in a previously described query translation phase from a top-level SQL statement 202 opens these cursors. Initially, a top-level SQL query 202 is executed and its SQL result set is pushed onto a logical stack; and parameterized queries 204 are prepared. As an XML query cursor moves to different XML nodes in an XML query result, one or more parameterized SQL queries 204 are executed with parameters associated with a current XML query cursor position. SQL query results from executed parameterized SQL queries 204 are pushed onto or popped off of a logical stack. The movement of an XML query cursor to different XML nodes in a result drives the execution of prepared parameterized queries. At any time, the current XML node corresponds to the current tuple of a result set on the top of the stack, and current tuples of the rest of the result sets on the stack correspond to all ancestors, in sequence, of the current XML node.

Figure 3C:
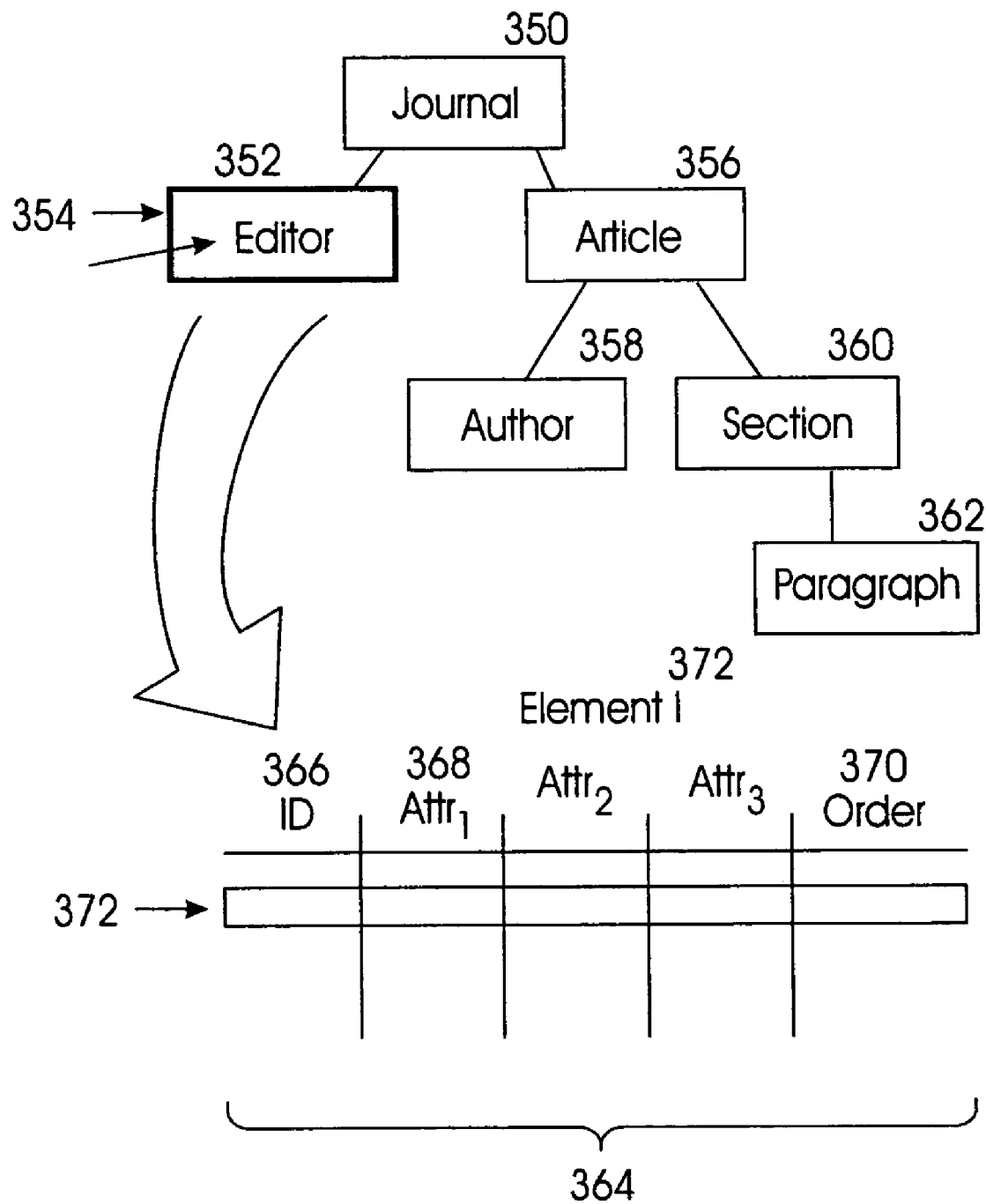
FIG. 3c illustrates an instance of an XML query cursor.

FIGS. 3a and 3b shows a pseudo code implementation for all cursor movements. The details of cursor movements and the corresponding execution of parameterized queries are shown in FIG. 3c. lastChildNode( ) 320 is a helper method. Child element types of a parent type are assumed to follow a particular sequence, getNEFirstChildResultSet( ) returns a first non-empty child result set of a current node; similarly, getNENextSibResultSet( ) returns a first non-empty sibling result set. A child result set is a relational table corresponding to a child element type on which an XML query cursor is positioned.

In a multi-cursor embodiment, a cursor is defined for each relational table in an SQL query result. In one context, when an application moves an XML query cursor 352 to a new XML node 354 in a result set, an SQL cursor corresponding to a new XML node is opened and a query is executed or, if a new XML node 354 is of the same element type as the previous XML node upon which the cursor was placed, a subsequent tuple from a currently open SQL cursor is fetched. For example, if an XML query cursor is positioned over an Editor element 102 and there are more Editor elements in the XML schema, a currently open SQL cursor will execute an SQL fetch next operation to retrieve a next Editor element. Since an application may traverse a query result set in any direction and to any depth, it is possible that there are a plurality of SQL cursors 372 opened for the XML query cursor 354 of a document at any given point; this would consume additional database memory and add extra query processing time. Thus, an approach is described that minimizes the number of SQL cursors 372 opened. An outer union approach observes this philosophy by opening a single SQL cursor 372 for an XML query cursor 354. It adopts a modified version of an outer union approach first proposed in prior references, in that during query processing phase returns an entire XML result set, as opposed to nodes of a given element type.

An Outer Union Approach

In another embodiment, a sorted outer union method is used for XML query cursor implementation. A sorted outer union method was chosen for XML query cursor implementation from prior art because it structures relational tuples in an order corresponding to the order they need to appear in an XML result set. FIG. 4 shows a translated outer union SQL query 400 translated from an XQuery statement 200 shown in FIG. 2.

The step of query processing in an outer union embodiment comprises translating an XQuery statement 200 into a top-level SQL query 202 as described in a previous embodiment, adding all attributes of a root element to a translated query, extracting user-specified sorting columns, creating a common table expression for this query, and making it a top-level common table expression. In an outer union approach, only one SQL query is generated. For each descendant element 102, 104, 106 of a root element 100; a unique element number 372 is assigned and a common table expression following an SQL template 412 in FIG. 4 is created. An outer union common expression is composed by using a "union all" SQL command 406 with each common expression created for each descendant element 102, 104, 106 and adding a null value to other columns. A query translation algorithm is completed by combining all common expressions and creating a "select" statement 408 from an outer union common expression, and finally, adding an "order by" clause 410 with user-specified sorting columns followed by all element ids in XML data represented in a relational table.

An outer union method produces results that are optimal for sequential cursor movements such as moving to some next or previous node (e.g., nextNode( ) 604, 608 and previousNode( ) 606, 610). In many other cases, for instance, in a nextSibling( ) function 616, a certain amount of tuples in an SQL query result need to be skipped before a destination tuple is reached. An outer union method of this embodiment adopts a modified version of an outer union method first proposed in prior art in that an entire XML result set is returned during the processing step. If a relational database is implemented such that it is faster when given distance information from a current tuple to a destination tuple than to continue fetching a next tuple a number of times, computing the distance as part of a top-level SQL query is of interest.

A DB2 OLAP partition function first proposed in prior art is used to calculate distance information optionally included in a top-level SQL query. For example, an SQL statement shown in FIG. 5 calculates the distance from a node to the root of its next tree and the number of descendents of a node (including itself), respectively. The latter equals a distance to a next sibling if it exists or a distance to a next node excluding descendants. This embodiment assumes the element type is recorded in an outer union table 510.

In computing the distance to a next tree, a root element id column is used as the partition column because the distance is determined solely by the position of a node within its result tree. The rest of the id columns are order columns. A rank( ) function 502 is based upon order columns to determine a ranking. A rank( ) function is used for assigning a consecutive number to rows within each partition. Since numbering is consecutive, it can be determined how many tuples away a target is from a current position. Columns appear in the same sequence as in an outer union query but are sorted in descending order.

In computing the number of descendants, for each element type, the id columns of its ancestor types and itself are partition columns and those of its descendant types are order columns which, and as with the case above, appear in the same sequence as in an outer union query but are sorted in descending order. In another embodiment, a count( ) function is used to compute distance. In this case, an "order by" clause would not be needed in an SQL query.

In FIG. 5, although presented as separate SQL statements, distance information statements can be incorporated into a query formed by an outer union embodiment described previously. In this manner, an XQuery can still be translated to a single SQL query. Putting query elements 502–508 shown in FIG. 5 between a select statement 408 and an "order by" clause 410 shown in FIG. 4 forms a single SQL query.

With an XML result presented as relational tuples generated by executing an SQL query formed by an outer union approach, implementation of a navigation function is described. A sequential movement to a next or previous XML node corresponds to a next or previous operation of a relational database cursor thus; multiple database cursor operations are needed for a non-sequential movement unless distance information is available.

FIGS. 6a–6c illustrates pseudo code for cursor movements in this embodiment. FIGS. 6a and 6b illustrates functions without distance information where currentTree( ) 620 is a helper function. FIG. 6c illustrates functions with distance information where relativeNode( ) 632 and currentTree( ) 634 are helper functions. An fCurrentNode variable stores a current XML node constructed from a current tuple (e.g. tuple corresponding to the node on which an XML query cursor is currently positioned) immediately before it is used; and an fSavedNode variable stores an XML node constructed from a current tuple at the very beginning of an axis operation. An XML node is built in such a way to support predicates such as isChildOf( ), isDescendantOf(.), and isSiblingOf(.). Functions such as getDescendantCount( ) are used to retrieve distance information when available.

A Hybrid Approach

While an outer union approach is well suited for sequential cursor movements, a hybrid approach is better suited for a structurally aware movement by an XML query cursor, such as moving to a next sibling. Although a multi-cursor approach is well suited for structurally aware cursor movements as well, cases exist where multiple SQL queries have to be executed for a single such movement. In the case where a parent element type has a number of different child element types which follow an ordered sequence, and a parent node of a parent element type has two child nodes— one of a first child element type and another of a last child element type, navigation from the first child node to the second and last child node will cause parameterized SQL queries to be executed for all child elements types except for the first child element type. Parameterized SQL queries executed for any child element type but the first child element type and the last child element type will result in wasted query processing time.

In order to achieve better performance for a structurally aware traversal as described in the previous scenario, a hybrid approach based on multi-cursor and outer union approaches is described. The approach applies an outer union technique to return all child nodes, possibly being of different elements types, of a parent node using a single SQL query. One SQL query is generated for each level of elements. Depending on current position of an XML query cursor, multiple SQL cursors may be open, one for each ancestor level in a result tree or trees. Thus, unnecessary parameterized SQL queries do not need to be executed to retrieve nodes at the same level of hierarchy.

The step of query processing in a hybrid approach is similar to the step of query processing described for a multi-cursor approach. Query processing for a hybrid approach translates an XQuery statement into a top-level SQL query and generates a list of parameterized SQL queries. Translation to a top-level query follows the same steps as described for a multi-cursor approach, however, formation of parameterized queries differs in that features of an outer union approach are utilized. More specifically, one parameterized SQL query is generated for each non-leaf element type, which produces child nodes of a parent node when executed in conjunction with a parent's ID.

One parameterized SQL query generated by this approach is similar to an SQL query described for an outer union approach. However, differences lie in a fact that, for a given parent element type, only IDs and attributes of its child element types are included, and an ID of a parent node is parameterized. For the same examples used by previous sections, a parameterized query 700–708 generated for an XQuery in FIG. 2 in this embodiment is shown in FIG. 7.

A step of query processing in a hybrid approach comprises steps of translating a query from an XQuery statement to an SQL statement, adding all attributes of a root element to a SQL statement; and making it a top-level SQL query. If there are additional child element types, an SQL statement is built for each child element type, a common table expression 712 is created by following an SQL template in FIG. 7 and an outer union common expression 704 is composed. Each query constructed from a top-level SQL query is associated with a corresponding element in a schema hierarchy. Parent-child relationships between parameterized queries are thus reflected in the hierarchy. This process is repeated to construct a parameterized version of a top-level SQL query for all descendant elements of a root element.

A step of query result navigation for a hybrid approach involves opening multiple cursors and implementing a logical stack of SQL result sets to implement navigation functionalities similar to a multi-cursor approach. Axis operations such as childNode( ) 800 and nextSibling( ) 802 now take advantage of a fact that all the children of a parent are in one result set as shown in FIG. 8.

An XML query cursor movement such as nextSibling( ) 802 is optimized here because it corresponds to a single next cursor movement operation of a database cursor. childNode( ) 800 is also optimized because it will require a single query execution and a single database "next" operation, unlike multiple query executions which is possible for a multi-cursor approach.

Positioned Update

Given a position of an XML query cursor, the following information is retrieved: current element type, current ID value, and ID of a parent of a current node. FIG. 9 shows SQL queries for inserting, updating, and deleting attributes from an appropriate table and row. FIG. 9 also shows SQL queries for inserting, updating and deleting an XML node or sub-tree. In the following attribute update operations, an attribute to be inserted is mapped to column $ATTR_k$ and a new value for the attribute is mapped to ATTRValue. To insert or update an attribute, an SQL update statement 900 is formed and executed. To delete an attribute, an SQL update statement 902 is formed and executed. A null value is used to represent an attribute not supplied in a document. In the following node or sub-tree update operations, Value-Tree is an XML node or sub-tree to be inserted, $ValueTree_0$ is the root element of the XML node or sub-tree to be inserted, corresponding attributes map to the columns of a table for $ELEMENT_i$ (e.g., $ATTR_{(0,1)}$, $ATTR_{(0,2)}$, . . . , $ATTR_{(0,k)}$), and IDnew is a new unique ID value for the element. In addition, for each recursive iteration, a current ID value is saved as a parent ID for the next level of child element types.

To insert an XML node or sub-tree, an SQL insert statement 904 is formed and executed. Each descendant element of ValueTree is iterated through recursively where the subscript "j" corresponds to descendant element ID numbers, and an SQL insert statement 906 is formed and executed for each descendant element.

To delete an XML node or sub-tree, all tables corresponding to each descendant element type of $ELEMENT_j$ are iterated through recursively. Assuming a table mapping to the current element type is $ELEMENT_j$, for each ID value being fetched, an SQL delete statement 910 is formed and executed. A replace operation for an XML node or sub-tree is performed by performing a delete operation followed by an insert operation for a new value.

Optimal Selection

Figure 10:
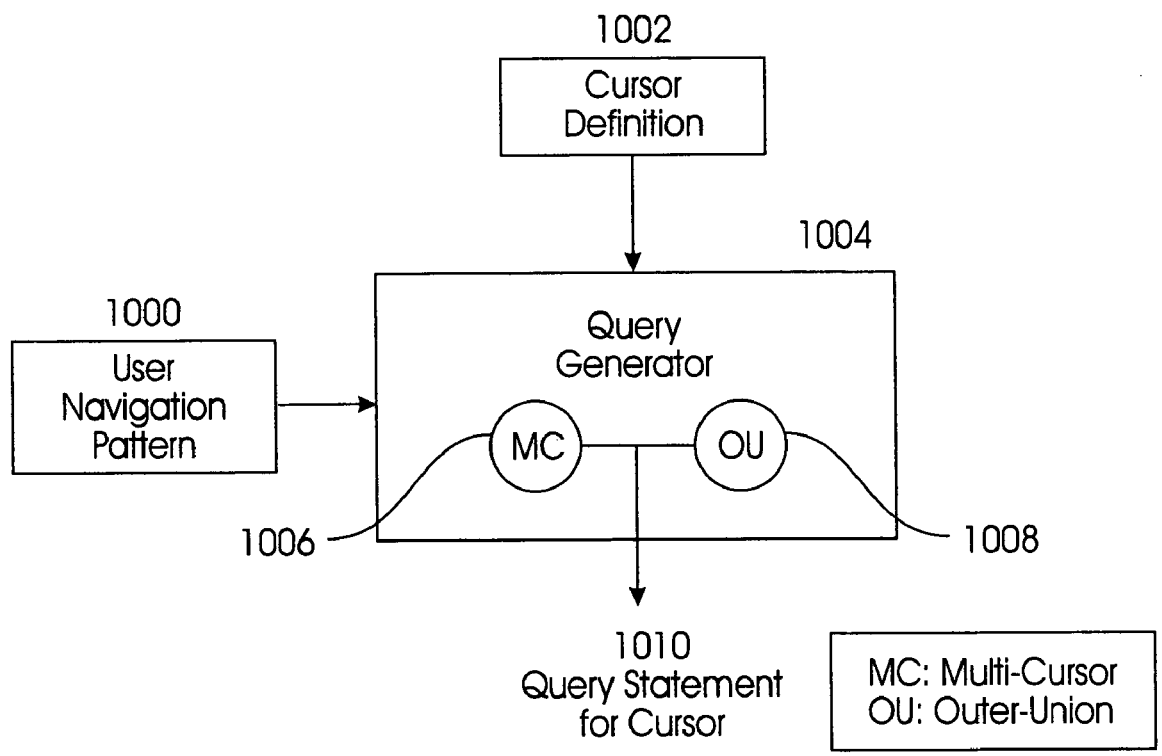
FIG. 10 illustrates selection of optimal cursor implementation.

To optimize navigation functionality if a user's access pattern is sequential, a method of query navigation is provided by an outer union approach. If a user's access pattern is structurally aware, a multi-cursor and a hybrid method of query navigation optimize navigation functionality. A system is described that combines techniques used in previous embodiments to achieve optimal performance, given a user's access pattern. An example user access pattern and its corresponding optimal hybrid implementation are given in FIG. 10. Given a user's navigation pattern 1000 and a cursor definition 1002, a query generator 1004 will use either multi-cursor 1006, outer union 1008, hybrid, or a mixture of all three techniques to generate a query statement 1010 for a particular cursor.

Since neither a multi-cursor approach nor an outer union approach is optimal for all patterns of result navigation, a system is described which evaluates a user's access pattern and selects a method that will be used to construct a cursor, given an XML query cursor declaration. If a chosen cursor declaration does not provide for scrolling, an outer union approach would be optimal because only forward sequential cursor movement would be allowed. If a chosen cursor declaration is scrollable, output is decided by a user navigation pattern. In one embodiment, statistics gathered from cursor movement pattern are used to choose the appropriate cursor implementation.

Cursor Interface Definition

As an extension to XQuery, a cursor is declared and can be opened and closed. A cursor may also fetch a next unit of data given a cursor name, an axis operation, a fetch unit, and a context unit. A cursor may also be positioned or perform positioned update where update operations may occur. FIG. 11 illustrates these operations.

An SQL declare statement 1100 defines characteristics associated with a cursor. It is defined by the following elements. Cursor name 1102, specifies a name for a cursor, which is used as a label in other cursor operations 1120, 1124, 1128, 1138, 1144, and 1150. Xquery-expr 1108 specifies an XML Query expression, which identifies a result where a cursor is bound on. Sensitivity 1112 defines a sensitivity of a cursor, where a cursor will see the effects of other statements in a transaction while a cursor is open. INSENSITIVE means changes made by other commands in a transaction will not be visible to a cursor. SENSITIVE means the opposite. Scroll 1106 specifies where a cursor is a scrollable cursor. With a scrollable option, position operations are not limited to just "NextNode" operations. Updatability 1110 specifies where a cursor is updateable. If the field has a READ ONLY value, no update operation can be performed upon a cursor. Update can be only specified if a query is updateable. In other words, data in a result set is not constructed at run-time. The data must have a corresponding one-to-one correspondence to a backend XML storage. Optimization 1116 specifies any hint that can give a system a better understanding of a usage pattern; as a result, leads to a better optimization. N-level specifies the application will iterate through a result set at some maximum depth.

An SQL open 1118 statement opens a cursor and executes an XML query defined in a previous SQL declare statement. A result set will be identified, but may or may not be physically materialized. A physically materialized set is a result set that has been formed and is currently stored in a temporary storage table area and is awaiting a cursor operation to fetch data from its current storage place. If a query has not been completely executed, then a result set is not materialized, and the result will be evaluated by the execution of a query with the movement of a cursor. If a cursor is declared sensitive, an entire result set is materialized after the cursor is first opened because the latest change in a result set as a result of cursor movement must be reflected.

An SQL close 1122 statement closes a cursor and releases any resources associated it. In order to close an XML query cursor, it must have been opened at some time.

An SQL fetch 1126 statement causes a cursor to move to a given position and specifies content being retrieved for a host program. An SQL fetch statement comprises the following parts—a cursor name 1128, an axis operation 1130, a fetch-unit 1132, and a content-unit 1134.

Axis operation 1130 specifies a position where a cursor should be. Cursor position is described as being on a node, not between nodes. If a cursor is not declared as "Scrollable", only the "NextNode" operation is enabled. NextTree and PreviousTree go to a root node of a next or previous tree in a result sequence, respectively. NextNode and PreviousNode go to a next or previous node in a current tree in document order, respectively. If the current node is a last or first node in the current tree, NextNode/PreviousNode will jump to a first or last node of a next or previous result tree. Other axis operations do not go to nodes beyond a current tree. Fetch unit 1132 specifies a unit of data being fetched. It could be a current node, a sub-tree of which the current node is a root, or a sub-tree of a certain depth. Content unit 1134 specifies for each node fetched, where it contains text only, attributes only, or the entire node.

An SQL save 1136 statement saves a current cursor position to a host variable 1140. An SQL set 1142 statement sets a current cursor position to a position specified in a given host variable 1146. An SQL update 1148 statement performs an update operation at a cursor's current position. An update operation can be categorized into two types—update operations on attributes or update operations on a node or entire sub-tree.

FIGS. 12a–12d illustrate XML query cursor implementation in an Interface Definition Language (IDL).

Conclusion

A method has been shown in the above embodiments for the effective implementation of XML query cursor support on an XML repository built on top of a relational database system. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program or computing environment. While various preferred embodiments have been shown and described for an unordered data model and a relational database, the present invention should not be limited thereto, e.g., an order data model is within the scope of the present invention.

The above enhancements for described functional elements are implemented in various computing environments. For example, the present invention may be implemented on a conventional IBM PC or equivalent. All programming and data related thereto are stored in computer memory, static or dynamic, and may be retrieved by a user in conventional computer storage. The programming of the present invention may be implemented by one of skill in the art of object-oriented and database programming.

Furthermore, the present invention includes a computer program code based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code based products are software modules for: translating a query issued over an XML document into an SQL query, processing an SQL query to generate one or more additional SQL queries, choosing an SQL query or queries to send to a relational database by way of a navigation component, executing an SQL query or queries, navigating a dataset resulting from the execution of an SQL query or queries, positioned update, and selecting an optimal cursor implementation.

The invention claimed is:

1. A method for providing an XML query cursor for traversing and fetching XML data, said XML query cursor constructed via a hybrid approach, said method for queries of XML data stored in a relational database comprising steps of:
   a. receiving one or more queries;
   b. translating received queries into one or more SQL queries,
   c. based on XML query cursor position, selecting specific SQL queries from among said one or more SQL queries and executing said specific SQL queries of data located in said relational database, said step of selecting and executing specific SQL queries further comprising: choosing a query generated for a root node, sending it to and executing it in said relational database if a previous tree root or next tree root node is selected by XML query cursor position; choosing a parameterized SQL query generated for current element type if a previous sibling or next sibling node is also selected by XML query cursor position; choosing one or more parameterized SQL queries, depending on the element type of a selected node, sending one or more queries to and executing one or more queries in said relational database if necessary, if a previous or next node is requested by XML query cursor position; and navigating to a previous or next tuple of dataset result generated by said execution of selected SQL queries and returning said previous or next tuple, and
   d. returning XML data from said executing step.

2. A method for providing an XML query cursor for traversing and fetching XML data, as per claim 1, wherein said traversing comprises traversing an XML document in increments of a node, sub-tree, and tree.

3. A method for providing multi-dimensional XML cursor functionality for a query of XML data stored in a relational database comprising steps of:
   a. receiving a query issued over an XML document;
   b. translating said query issued over an XML document into a top-level SQL query returning only root nodes in a result,
   c. generating one or more additional SQL queries,
   d. choosing an SQL query or SQL queries to send to said relational database via an XML cursor, said XML cursor constructed via an outer union approach,
   e. executing said SQL query or SQL queries, and
   f. navigating a dataset resulting from execution of said SQL queries, said navigating step comprising: choosing and executing a single SQL query to said relational database with resulting dataset; navigating to a previous or next tuple in said resulting dataset and returning said next or previous tuple if the previous or next node is requested by a navigation component; traversing through previous tuples in said resulting dataset until a parent, previous sibling, or previous tree root tuple is found, and navigating to a desired tuple directly if distance information is available, and returning said tuple if a parent, previous sibling, or previous tree root node is requested by said navigation component; or traversing through next tuples in said resulting dataset until a child, next sibling, or next tree root tuple is found, or going to a desired tuple directly if distance information is available, and returning said tuple if a child, next sibling, or next tree root node is requested by said navigation component.

4. A method for providing multi-dimensional XML cursor functionality, as per claim 3, wherein said sorted outer union approach further comprises incorporating distance information in said SQL query.

5. A method for providing multi-dimensional XML cursor functionality, as per claim 4, wherein said outer union approach incorporates in said SQL query distance information obtained from an OLAP partition function.

6. A method for providing multi-dimensional XML cursor functionality, as per claim 3, wherein XML cursor movements occur in increments comprising a node, sub-tree, and tree.

7. A method for providing multi-dimensional XML cursor functionality, as per claim 3, wherein a location of an XML data update is determined by current XML query cursor position.

8. A method for providing multi-dimensional XML cursor functionality, as per claim 7, wherein said positioned update operation comprises any of: insertion, update, and deletion.

9. A method for providing multi-dimensional XML cursor functionality, as per claim 3, further comprising in said relational database changes made to XML data corresponding to one or more nodes or one or more sub-trees in an XML document are updated in said relational database by the execution of one or more SQL statements to perform positioned update operations.

10. A method for providing multi-dimensional XML cursor functionality, as per claim 9, wherein said positioned update operation comprises any of: insertion, replacement, and deletion.

11. A method for providing multi-dimensional XML cursor functionality, as per claim 10, wherein deleting said current node or sub-tree followed by inserting said new node or sub-free performs said positioned update replacement operation of node or sub-tree.

12. A method for providing multi-dimensional XML cursor functionality, as per claim 10, wherein said insertion of a node or sub-tree is performed by executing an SQL insert statement for a root element and recursively iterating through each descendant element of said node or sub-tree to perform an SQL insert statement for each descendant element.

13. A method for providing multi-dimensional XML cursor functionality, as per claim 10, wherein said deletion of said node or sub-tree is performed by recursively iterating through relational tables in a relational database corresponding to each descendant element type of a current element type in an XML document, fetching an ID value associated with a element type, and executing an SQL delete statement for ID value fetched.

14. A system for multi-dimensional navigation of an XML document comprising:
  a. an XML cursor manipulated by a user, said XML cursor implemented via a hybrid approach, said hybrid approach has steps comprising: choosing a query generated for a root node, sending it to and executing it in said relational database if a previous tree root or next tree root node is selected by XML query cursor position; choosing a parameterized SQL query generated for current element type if a previous sibling or next sibling node is also selected by XML query cursor position; choosing one or more parameterized SQL queries, depending on the element type of a selected node, sending one or more queries to and executing one or more queries in said relational database if necessary, if a previous or next node is requested by XML query cursor position, and navigating to a previous or next tuple of dataset result generated by said execution of selected SQL queries and returning said previous or next tuple, and
  b. an XML schema over which said XML cursor navigates,
  c. a relational database for storing tuples of XML data corresponding to said XML document, and
  d. a relational database cursor for traversing said tuples of XML data.

15. A method for providing multi-dimensional XML cursor functionality for a query of XML data stored in a relational database comprising steps of:
  a. receiving a query issued over an XML document;
  b. translating said query issued over an XML document into a top-level SQL query that will return only root nodes in a result,
  c. generating one or more additional SQL queries,
  d. choosing an SQL query or SQL queries to send to said relational database via an XML cursor, said XML cursor constructed via an hybrid approach,
  e. executing said SQL query or SQL queries, and
  f. navigating a dataset resulting from execution of said SQL queries, said navigating step comprising: choosing said top-level SQL query generated for a root node, sending it to and executing it in said relational database if a previous tree root or next tree root node is requested by said navigation component; choosing said parameterized SQL query generated for current element type if a previous sibling or next sibling node is requested by navigation component, choosing one or more parameterized SQL queries, depending on the element type of a requested node, sending one or more queries to and executing one or more queries in said relational database if necessary, if a previous or next node is requested by navigation component; and, navigating to a previous or next tuple of dataset result generated by said execution of chosen parameterized or top-level SQL queries and returning said previous or next tuple.

* * * * *